(12) United States Patent
Li et al.

(10) Patent No.: US 11,792,067 B2
(45) Date of Patent: *Oct. 17, 2023

(54) FLEXIBLE ETHERNET COMMUNICATION METHOD AND NETWORK DEVICE

(71) Applicant: HUAWEI TECHNOLOGIES CO., LTD., Shenzhen (CN)

(72) Inventors: Chunrong Li, Dongguan (CN); Jingfeng Chen, Dongguan (CN); Hongliang Sun, Shenzhen (CN); Jun Hu, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 16 days.

This patent is subject to a terminal disclaimer.

(21) Appl. No.: 17/404,220

(22) Filed: Aug. 17, 2021

(65) Prior Publication Data
US 2021/0377103 A1 Dec. 2, 2021

Related U.S. Application Data

(63) Continuation of application No. PCT/CN2020/073625, filed on Jan. 21, 2020.

(30) Foreign Application Priority Data

Feb. 19, 2019 (CN) .......................... 201910121442.4

(51) Int. Cl.
*H04L 41/0677* (2022.01)
*H04L 41/0631* (2022.01)
*H04L 41/0686* (2022.01)

(52) U.S. Cl.
CPC ...... *H04L 41/0677* (2013.01); *H04L 41/0631* (2013.01); *H04L 41/0686* (2013.01); *H04J 2203/006* (2013.01); *H04J 2203/0085* (2013.01)

(58) Field of Classification Search
CPC ............. H04L 41/0677; H04L 41/0631; H04L 41/0686; H04L 12/40182; H04L 41/0613;
(Continued)

(56) References Cited

U.S. PATENT DOCUMENTS 8,717,881 B1 * 5/2014 Schmalz ................. H04L 43/16
370/242
2004/0228429 A1 11/2004 Schanke et al.
(Continued)

FOREIGN PATENT DOCUMENTS

CN 106330630 A 1/2017
CN 106612203 A 5/2017
(Continued)

OTHER PUBLICATIONS

"OTN Interface Standards for Rates Beyond 100 GB/s"; Gorshe; Journal of Lightwave Technology, vol. 36, No. 1, Jan. 1, 2018 (Year: 2018).*

(Continued)

*Primary Examiner* — Benjamin H Elliott, IV
(74) *Attorney, Agent, or Firm* — Rimon PC

(57) ABSTRACT

This application provides an isolation and recovery method and related network device for a case when one or more physical layer apparatuses (PHYs) in a flexible Ethernet group (FlexE group) are faulty. In the method, if a network device determines that a first overhead block corresponding to each current available PHY is stored in a corresponding memory, the network device determines that a FlexE group meets a PHY alignment condition, and starts to simultaneously read cached data from all memories. Therefore, there is no need to insert local fault LF code blocks to all clients, and there is no need to recreate a group. This effectively reduces the impact of a faulty PHY on client services carried by a normal PHY.

15 Claims, 11 Drawing Sheets

(58) Field of Classification Search
CPC ............. H04L 41/0659; H04L 41/0604; H04L 49/604; H04L 49/351; H04J 2203/006; H04J 2203/0085; H04J 3/14; H04J 3/1658

See application file for complete search history.

(56) References Cited

U.S. PATENT DOCUMENTS

| | | | |
|---|---|---|---|
| 2008/0170582 | A1 | 7/2008 | Wang et al. |
| 2009/0247068 | A1* | 10/2009 | Toyoda ............... H04J 3/04 455/8 |
| 2017/0005742 | A1* | 1/2017 | Gareau ............ H04J 3/1611 |
| 2017/0005901 | A1* | 1/2017 | Gareau ............ H04L 43/10 |
| 2017/0005949 | A1* | 1/2017 | Gareau ............ H04L 12/413 |
| 2017/0006360 | A1 | 1/2017 | Gareau |
| 2017/0026226 | A1 | 1/2017 | Grussling et al. |
| 2017/0272308 | A1* | 9/2017 | Stone ............... H04B 10/25 |
| 2018/0013511 | A1 | 1/2018 | Hussain et al. |
| 2018/0069732 | A1 | 3/2018 | Sugawara |
| 2018/0076932 | A1 | 3/2018 | Okada |
| 2018/0248905 | A1* | 8/2018 | Côté ............... G06K 9/6269 |
| 2021/0377103 | A1* | 12/2021 | Li ............... H04J 3/1658 |

FOREIGN PATENT DOCUMENTS

| | | |
|---|---|---|
| CN | 106612220 A | 5/2017 |
| CN | 107888345 A | 4/2018 |
| CN | 108075903 A | 5/2018 |
| CN | 108347317 A | 7/2018 |
| CN | 108809674 A | 11/2018 |
| CN | 108809901 A | 11/2018 |
| CN | 109218061 A | 1/2019 |
| EP | 3522465 A1 | 8/2019 |
| JP | 2018085653 | 5/2018 |
| JP | 2018101959 A | 6/2018 |
| WO | 2018099161 A1 | 6/2018 |
| WO | 2018196600 A1 | 11/2018 |
| WO | 2019029286 A1 | 2/2019 |

OTHER PUBLICATIONS

English translation international search report (ISR), PCT/CN2020/073625, dated Apr. 17, 2020 (Year: 2020).*
IA OIF-FLEXE-01.0, Flex Ethernet Implementation Agreement, Mar. 2016, total 31 pages.
IA OIF-FLEXE-02.0, Flex Ethernet 2.0 Implementation Agreement, Jun. 22, 2018, total 51 pages.
IEEE Std 802.3TM-2018(Revision of IEEE Std 802.3-2015), IEEE Standard for Ethernet LAN/MAN Standards Committee of the IEEE Computer Society, Approved Jun. 14, 2018, IEEE-SA Standards Board, total 5600 pages.
Ouyang Chunbo et al., "Research and Application of FlexE-based Slicing Isolation in Bearer Network", Telecommunications Technology, Issue 12, 2018, including English Abstract; 9 total pages.

* cited by examiner

FLEXIBLE ETHERNET COMMUNICATION METHOD AND NETWORK DEVICE

CROSS-REFERENCE TO RELATED APPLICATIONS

This application is a continuation of International Application No. PCT/CN2020/073625, filed on Jan. 21, 2020, which claims priority to Chinese Patent Application No. 201910121442.4, filed on Feb. 19, 2019. Both of the aforementioned applications are hereby incorporated by reference in their entireties.

TECHNICAL FIELD

This application relates to the field of communications technologies, and in particular, to a flexible Ethernet (FlexE) communication method, a network device, and a system.

BACKGROUND

A FlexE technology is a low-cost and high-reliability carrier-class interface technology that is implemented based on a high-speed Ethernet interface by decoupling an Ethernet media access control (MAC) layer from a physical layer. In the FlexE technology, a flexible Ethernet shim layer is introduced according to IEEE 802.3, to implement decoupling between the MAC layer and the physical layer, thereby implementing flexible rate matching.

In the FlexE technology, functions such as binding a plurality of Ethernet physical layer apparatuses (the physical layer apparatus is briefly referred to as a PHY below) into a flexible Ethernet group and channelizing a physical layer are used to meet an application requirement of a port for a flexible bandwidth. Therefore, a MAC rate provided by the FlexE may be higher than a rate of a single PHY (this is implemented through binding), or may be lower than a rate of a single PHY (this is implemented through channelization).

According to the solutions in a current FlexE standard and the related prior art, if one or more PHYs in a FlexE group are in a faulty state, all flexible Ethernet client services carried in the entire FlexE group are marked as damaged, that is, a client service carried by a PHY that works normally is also deemed damaged, and interruption duration may reach dozens of milliseconds. Therefore, how to reduce the impact of a faulty PHY on a client service carried by a PHY in a normal state inside a same FlexE group becomes an urgent problem to be resolved presently.

SUMMARY

Embodiments of this application provide a FlexE communication method, to reduce impact of a PHY in a faulty state on a client service carried by a PHY in a normal state within a same FlexE group.

According to a first aspect, this application provides a flexible Ethernet FlexE communication method, where the method includes:

the first network device receives, by using p physical layer apparatuses (PHYs) in a flexible Ethernet group (FlexE group), p first overhead blocks sent by a second network device, where the p first overhead blocks are in a one-to-one correspondence with p FlexE overhead frames, the p FlexE overhead frames are in a one-to-one correspondence with the p PHYs, the FlexE group includes n PHYs, n≥2, and n is an integer, where in a first time period, m PHYs in the FlexE group are in a faulty state, the p PHYs are in a normal state, p+m=n, 1≤m<n, and both m and p are integers;

the first network device stores the p first overhead blocks in p memories in the n memories, where the p first overhead blocks are in a one-to-one correspondence with the p memories; and the first network device simultaneously reads the p first overhead blocks from the p memories.

In the present application, term "simultaneously" means substantially at the same time. In some embodiments, term "simultaneously" may be interpreted to mean in the same clock cycle. In some embodiments, term "simultaneously" may be interpreted to mean in the same unit used to measure time or speed.

In a possible design, the method further includes:

the first network device sends consecutive Ethernet local fault ordered sets in slots to which clients carried by the m PHYs are mapped.

In a possible design, that the first network device sends consecutive Ethernet local fault ordered sets in slots to which clients carried by the m PHYs are mapped includes:

the first network device writes the consecutive Ethernet local fault ordered sets into m memories corresponding to the m PHYs.

In a possible design, before the first network device stores the p first overhead blocks in the p memories in the n memories, the method further includes:

the first network device determines that a first PHY is in a faulty state, where the first PHY is one of the m PHYs;

the first network device sends an alarm, where the alarm indicates that a fault occurs in the FlexE group; and the first network device determines that a fault type of the first PHY is a first fault type, and stops the alarm.

In the prior art, when any PHY in a FlexE group is in a faulty state, a network device sends an alarm used to indicate that a fault occurs in the FlexE group, and does not stop the alarm until all PHYs in the FlexE group are in a normal state. When the first network device sends an alarm, the first network device switches to a FlexE group alarm state. In the alarm state, services of the entire FlexE group are affected and cannot work normally. According to the methods in this application, after sending an alarm, the first network device determines the fault type of the PHY, to determine whether or when to stop the alarm, thereby avoiding interruption of a client service carried by a normal PHY.

In a possible design, before the first network device stores the p first overhead blocks in the p memories in the n memories, the method further includes:

the first network device determines that a first PHY is in a faulty state, where the first PHY is one of the m PHYs; and the first network device determines that a fault type of the first PHY is a first fault type, and avoids sending an alarm indicating that a fault occurs in the FlexE group.

In this application, when one or more PHYs in a current FlexE group are faulty, a first overhead block of the faulty PHY is not used as a determining condition for PHY alignment. To be specific, it is considered that PHYs in the FlexE group are aligned provided that first overhead blocks of PHYs that are currently in a normal state in the FlexE group are all stored in corresponding memories. According to the technical solution provided in this application, impact of a faulty PHY on a normal PHY can be effectively isolated without a need to insert an LF (local fault) into a client, start group-level protection switching, and recreate a FlexE group. Therefore, it is ensured that a client service carried by the normal PHY is not affected, thereby improving service transmission reliability.

According to a second aspect, this application provides a flexible Ethernet (FlexE) communication method. In a first time period, the method includes:

the first network device receives, by using a flexible Ethernet group (FlexE group), n first overhead blocks sent by the second network device, where the FlexE group includes the n physical layer apparatuses (PHYs), the n first overhead blocks are in a one-to-one correspondence with n FlexE overhead frames, the n FlexE overhead frames are in a one-to-one correspondence with the n PHYs, n≥2, and n is an integer; the first network device stores the n first overhead blocks in n memories, where the n first overhead blocks are in a one-to-one correspondence with the n memories; and the first network device simultaneously reads the n first overhead blocks from the n memories, where the n first overhead blocks are read after a preset duration T starting from a moment at which a specific first overhead block is stored in a corresponding memory, the specific first overhead block is a last stored first overhead block in the n first overhead blocks, the duration T is greater than or equal to one clock cycle, and the clock cycle is the duration required by the first network device to perform one read operation on one memory.

A larger value of T indicates a larger delay deviation that can be tolerated. In an actual design, a person skilled in the art may configure the value of T based on an actual network scenario.

In a possible design, in a second time period, the method further includes:

the first network device receives, by using p PHYs in the FlexE group, p first overhead blocks sent by the second network device, where the p first overhead blocks are in a one-to-one correspondence with p FlexE overhead frames, the p FlexE overhead frames are in a one-to-one correspondence with the p PHYs, and in the second time period, m PHYs in the FlexE group are in a faulty state and the p PHYs are in a normal state, where n=p+m, 1≤m<n, and both m and p are integers; and the first network device stores the p first overhead blocks in p memories in the n memories, where the p first overhead blocks are in a one-to-one correspondence with the p memories; and the first network device simultaneously reads the p first overhead blocks from the p memories.

In a possible design, in the second time period, the method further includes:

the first network device sends consecutive Ethernet local fault ordered sets in slots to which clients carried by the m PHYs are mapped.

In a possible design, that the first network device sends consecutive Ethernet local fault ordered sets in slots to which clients carried by the m PHYs are mapped includes:

the first network device writes the consecutive Ethernet local fault ordered sets into m memories corresponding to the m PHYs.

In a possible design, in the second time period, before the first network device stores the p first overhead blocks in the p memories in the n memories, the method further includes:
the first network device determines that a first PHY is faulty, where the first PHY is one of the m PHYs;
the first network device sends an alarm, where the alarm indicates that a fault occurs in the FlexE group; and
the first network device determines that a fault type of the first PHY is a first fault type, and stops the alarm.

In a possible design, in the second time period, before the first network device stores the p first overhead blocks in the p memories in the n memories, the method further includes:
the first network device determines that a first PHY is faulty, where the first PHY is one of the m PHYs; and
the first network device determines that a fault type of the first PHY is a first fault type, and avoids triggering an alarm indicating that a fault occurs in the FlexE group.

In the foregoing method, a memory read delaying mechanism is set, so that after a first overhead block that is on a PHY and that arrives the latest in the FlexE group is stored in a memory, cached data starts to be simultaneously read from all memories, that is, first overhead blocks that correspond to PHYs and that are stored in the memories start to be simultaneously read, after a caching duration T. Therefore, a delay caused during PHY fault recovery can be absorbed in the caching duration T, so that the subsequent PHY re-alignment is avoided. In this way, service interruption is avoided, and lossless recovery of faulty PHYs can be implemented.

According to a third aspect, this application provides a network device, configured to implement the method in the first aspect, the second aspect, any possible design of the first aspect, or any possible design of the second aspect. In a possible design, the network device includes a receiver, a processor, and a memory.

According to a fourth aspect, this application provides a computer-readable storage medium. The computer-readable storage medium may be transitory or non-transitory, and stores an instruction, and when the instruction is run on a computer, the computer is enabled to perform the method in the first aspect, the second aspect, any possible design of the first aspect, or any possible design of the second aspect.

According to a fifth aspect, this application provides a non-transitory computer-readable storage medium, including a program used to implement the method in the first aspect, the second aspect, any possible design of the first aspect, or any possible design of the second aspect.

According to a sixth aspect, this application provides a communications system, including the network device provided in the third aspect and configured to perform the method in the first aspect, the second aspect, any possible design of the first aspect, or any possible design of the second aspect.

BRIEF DESCRIPTION OF DRAWINGS

FIG. 1A is a schematic diagram of a code pattern definition of 64B/66B coding according to an embodiment of this application;

FIG. 1B is a schematic diagram of a code pattern definition of an idle block according to an embodiment of this application;

DESCRIPTION OF EMBODIMENTS

Figure 2:
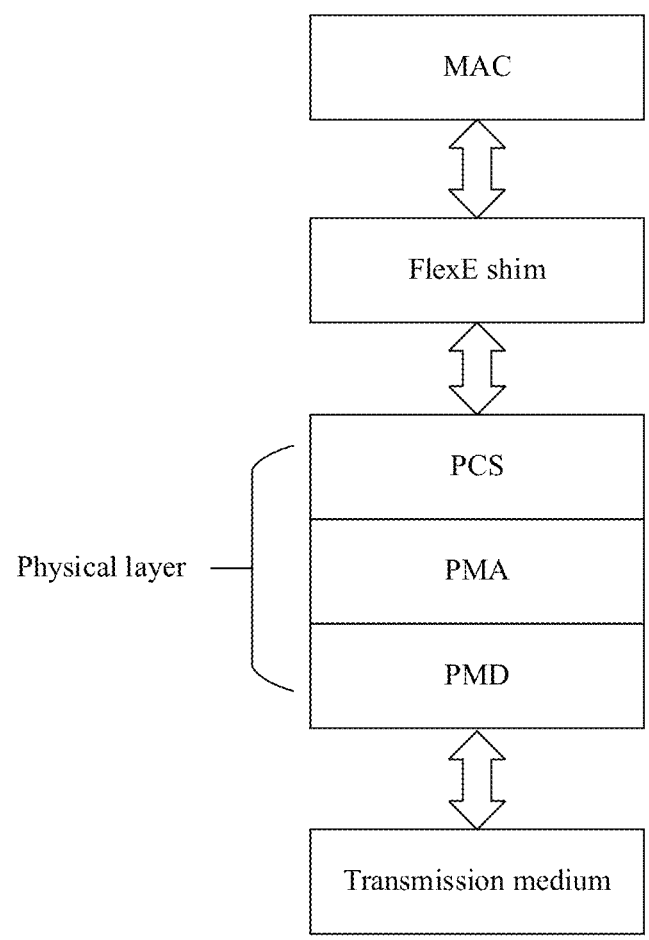
FIG. 2 is a schematic diagram of a FlexE standard architecture.

The following describes technical solutions of embodiments in this application with reference to accompanying drawings. A network architecture and a service scenario described in the embodiments of this application are intended to describe the technical solutions in the embodiments of this application more clearly, and do not constitute a limitation on the technical solutions provided in the embodiments of this application. A person of ordinary skill in the art may know that, with evolution of network architectures and emergence of new service scenarios, the technical solutions provided in the embodiments of this application are also applicable to similar technical problems.

Ordinal numbers such as "1", "2", "3", "4", "first", "second", "third", and "fourth" in this application are used to distinguish between a plurality of objects, but are not used to limit a sequence of the plurality of objects.

For the prior art related to FlexE in this application, refer to related descriptions of the FlexE standard IA OIF-FLEXE-01.0 or IA OIF-FLEXE-02.0 formulated by the optical internetworking forum (OIF). The above standards are incorporated herein by reference in their entireties.

In the Ethernet technology, an Ethernet port usually appears as a logical data-oriented concept and is referred to as a logical port or is briefly referred to as a port, and an Ethernet physical interface appears as a hardware concept and is referred to as a physical interface or is briefly referred to as an interface. Usually, a MAC address is used to mark an Ethernet port. Conventionally, the rate of an Ethernet port is determined based on a rate of the Ethernet physical interface. Usually, a maximum bandwidth of one Ethernet port corresponds to a bandwidth of one ethernet physical interface, such as an Ethernet physical interface of 10 megabits per second (megabit per second, Mbps), 100 Mbps, 1000 Mbps (1 Gbps), 10 Gbps, 40 Gbps, 100 Gbps, or 400 Gbps.

The Ethernet technology has been widely used and greatly developed for a long time in the past. The rate of an Ethernet port has increased tenfold, and is constantly developed from 10 Mbps to 100 Mbps, 1000 Mbps (1 Gbps), 10 Gbps, 40 Gbps, 100 Gbps, and 400 Gbps. With the development of technologies, a bandwidth granularity difference becomes larger, and a deviation from an actual application requirement and expectation is more likely to occur. A bandwidth for a mainstream application requirement does not increase tenfold, and for example, may be 50 Gbps, 75 Gbps, or 200 Gbps. In the industry, it is expected that support for an Ethernet port (a virtual connection) with a bandwidth of 50 Gbps, 60 Gbps, 75 Gbps, 200 Gbps, 150 Gbps, or the like is provided.

Further, it is expected that some ports with flexible bandwidths can be provided. These ports may share one or more Ethernet physical interfaces. For example, two 40GE ports and two 10GE ports share one 100G physical interface.

In addition, it is expected that a rate can be flexibly adjusted when a requirement changes, for example, from 200 Gbps to 330 Gbps, or from 50 Gbps to 20 Gbps, to improve port utilization or extend the service life of a port. Fixed-rate physical links may be cascaded and bound to support a stacked increase of a logical port rate (for example, two 100GE physical interfaces are stacked, cascaded, and bound to support a 200GE logical port). In addition, bandwidth resources obtained by flexibly stacking physical interfaces can be pooled, and bandwidths of the physical interfaces are allocated to a specific Ethernet logical port based on a granularity (for example, a granularity of 5G), so that several Ethernet virtual connections efficiently share a group of physical links that are stacked and cascaded.

Therefore, the concept of FlexE emerges. Flexible Ethernet is also referred to as flexible virtual Ethernet. The FlexE supports functions such as a subrate, channelization, and inverse multiplexing for an Ethernet service. For example, in a subrate application scenario of an Ethernet service, the FlexE can support transferring of a 250G Ethernet service (a MAC bitstream) through three existing 100GE physical interfaces. In an inverse multiplexing scenario of an Ethernet service, the FlexE can support transferring of a 200G Ethernet service through two existing 100GE physical medium dependent (PMD) sublayers. In a channelization scenario of an Ethernet service, the FlexE can support several logical ports in sharing one or more physical interfaces, and can support multiplexing of a plurality of low-rate Ethernet services into high-rate flexible Ethernet.

Because Ethernet is widely used as a service interface in an access network and a metropolitan area network, such FlexE technology based on a service traffic aggregation function of an Ethernet technology can implement a seamless connection to an Ethernet interface in an underlying service network. Introduction of the FlexE functions such as the subrate, channelization, and inverse multiplexing significantly extends application scenarios of the Ethernet, improves flexibility of Ethernet applications, and enables the Ethernet technology to gradually penetrate into a transport network field.

The FlexE technology provides a feasible evolution direction for virtualization of an Ethernet physical link. The Flexible Ethernet needs to support several virtual Ethernet data connections on a group of cascaded physical interfaces. For example, four 100GE physical interfaces are bound in a cascaded manner, to support several logical ports. If the bandwidths of some of the logical ports decrease, the bandwidths of the other logical ports increase, and a total bandwidth decrease amount is equal to a total bandwidth increase amount. The bandwidths of the logical ports are rapidly and flexibly adjusted, and the logical ports share the four 100GE physical interfaces.

With reference to a synchronous digital hierarchy (SDH)/optical transport network (OTN) technology, the FlexE constructs a fixed frame format for transmission on a physical interface, and performs TDM slot division. The following uses an existing FlexE frame format as an example for description. A TDM slot division granularity of the FlexE is 66 bits, which can exactly carry a 64B/66B bit block correspondingly. One FlexE frame includes eight rows. A FlexE overhead block is at the first 64B/66B bit block location in each row. A payload area in which slot division is performed exists after the overhead block. The payload area uses 66 bits as a granularity, and corresponds to 20×1023 pieces of 66-bit carrier space. A bandwidth of a 100GE interface is divided into 20 slots, and a bandwidth of each slot is approximately 5 Gbps. The FlexE implements a plurality of transmission channels, that is, implements a plurality of slots, on a single physical interface in an interleaving and multiplexing manner.

Several physical interfaces may be bound, and all slots of the physical interfaces may carry an Ethernet logical port in a combined manner. For example, a 10GE logical port requires two slots, and a 25GE logical port requires five slots. Sequentially transmitted 64B/66B bit blocks are visible on the logical port. Each logical port corresponds to one MAC, and transmits a corresponding Ethernet packet. Identification of a start and an end of the packet and idle padding are the same as those in the conventional Ethernet. The FlexE is only an interface technology, and a related switching technology may be performed based on an existing Ethernet packet, or may be performed based on the FlexE in a cross manner. Details are not described herein.

The bit block mentioned in this application may be an M1/M2 bit block, or may be referred to as an M1B/M2B bit block. M1/M2 represents a coding scheme, M1 represents a quantity of payload bits in each bit block, M2 represents a total quantity of bits in each bit block, M1 and M2 are positive integers, and M2>M1.

Figure 1A:
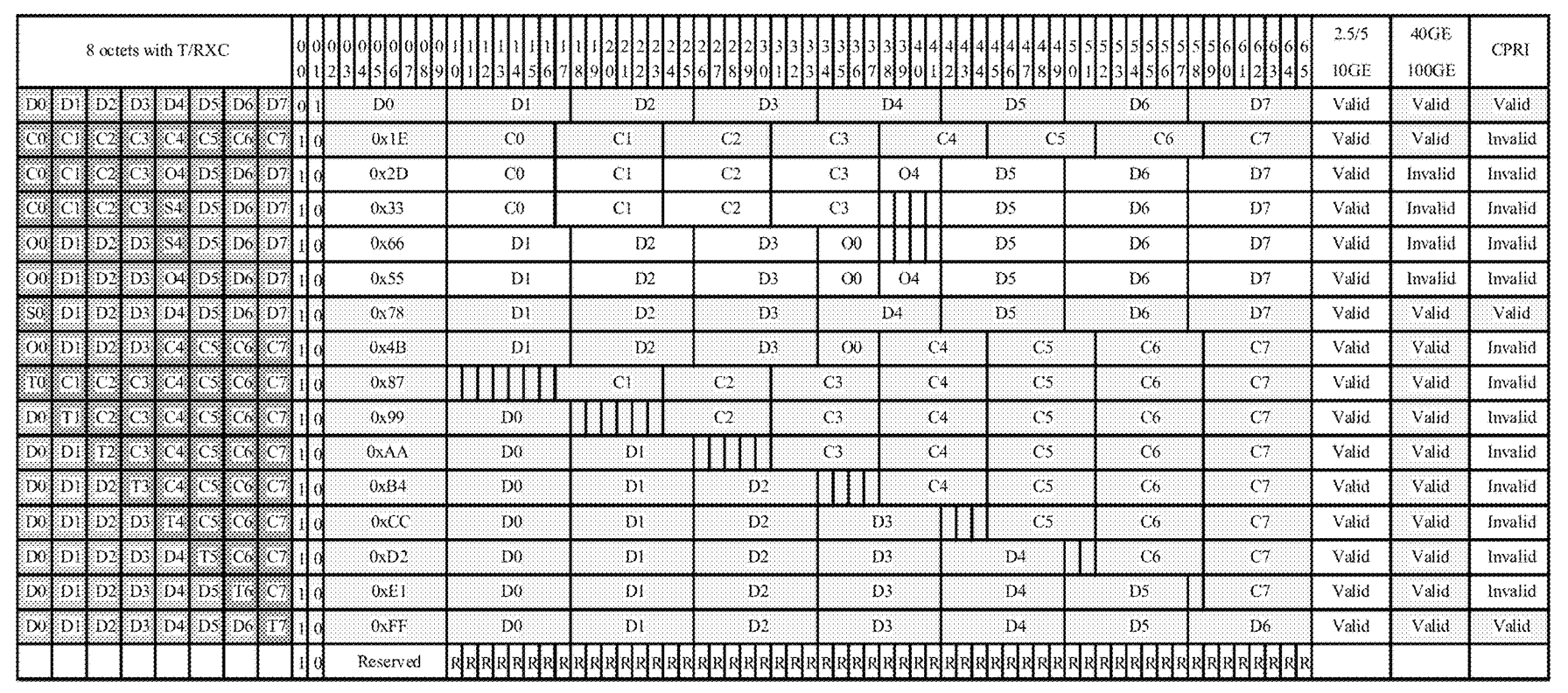
Figure 1B:
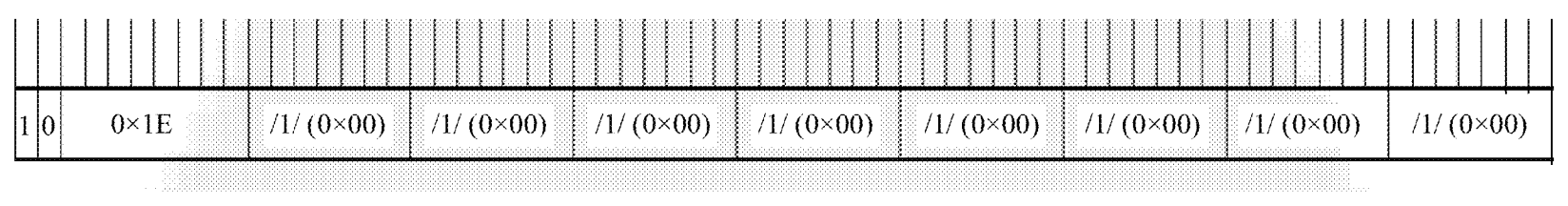

An M1/M2 bit block stream is transmitted on an Ethernet physical layer link. For example, 1G Ethernet uses 8/10-bit coding, and an 8/10-bit block stream is transmitted on a 1GE physical layer link. 10GE/40GE/100GE Ethernet uses 64/66-bit coding, a 64/66-bit block stream is transmitted on a 10GE/40GE/100GE physical layer link. With the development of the Ethernet technology in the future, other coding schemes may further occur, for example, 128/130-bit coding and 256/258-bit coding. For the M1/M2 bit block stream, different types of bit blocks exist and are clearly specified in the standards. The following uses a code pattern definition of 64/66-bit coding as an example for description. As shown in FIG. 1A, two header bits "10" or "01" are synchronization header bits of a 64/66 bit block, and following 64 bits are used to carry payload data or a protocol. In FIG. 1A, there are 16 code pattern definitions. Each row represents a code pattern definition of one type of bit block. D0 to D7 represent data bytes, C0 to C7 represent control bytes, S0 represents a start byte, and T0 to T7 represent end bytes. A second row corresponds to a code pattern definition of an idle bit block (idle block). The idle bit block may be represented by /I/, and details are shown in FIG. 1B. A seventh row corresponds to a code pattern definition of a start block. The start block may be represented by /S/. An eighth row corresponds to a code pattern definition of an O code block (for example, an OAM code block), and the O code block may be represented by /O/. Ninth to sixteenth rows correspond to code pattern definitions of eight end blocks. The eight end blocks may all be represented by /T/.

In the FlexE technology, a FlexE shim layer is introduced according to IEEE 802.3 to implement decoupling between a MAC layer and a physical layer. Implementation of the FlexE shim layer is shown in FIG. 2, and flexible rate matching is implemented. As shown in FIG. 2, a partial architecture of the FlexE includes a MAC sublayer, a FlexE shim layer, and a physical layer. The MAC sublayer is a sublayer of a data link layer, and is connected to an upper logical link control sublayer. The physical layer may be further divided into a physical coding sublayer (PCS), a physical medium attachment (PMA) sublayer, and a PMD sublayer. Functions of the foregoing layers are implemented by corresponding chips or modules.

In a signal sending process, the PCS is configured to perform operations such as coding, scrambling, overhead (OH) insertion, and alignment marker (AM) insertion on data. In a signal receiving process, the PCS performs inverse processing processes of the foregoing steps. Signal sending and signal receiving may be implemented by different function modules of the PCS.

Main functions of the PMA sublayer are link monitoring, carrier monitoring, coding/decoding, transmit clock synthesis, and receive clock recovery. Main functions of the PMD sublayer are data stream scrambling/descrambling, coding/decoding, and direct current restoration and adaptive equalization on a received signal.

It should be understood that the foregoing architecture is merely an example for description, and an architecture applicable to the FlexE in this application is not limited thereto. For example, a reconciliation sublayer (RS) may further exist between the MAC sublayer and the FlexE shim layer, to provide a signal mapping mechanism between an MII and the MAC sublayer. A forward error correction (FEC) sublayer may further exist between the PCS and the PMA sublayer, to enhance reliability of data transmission.

Figure 3:
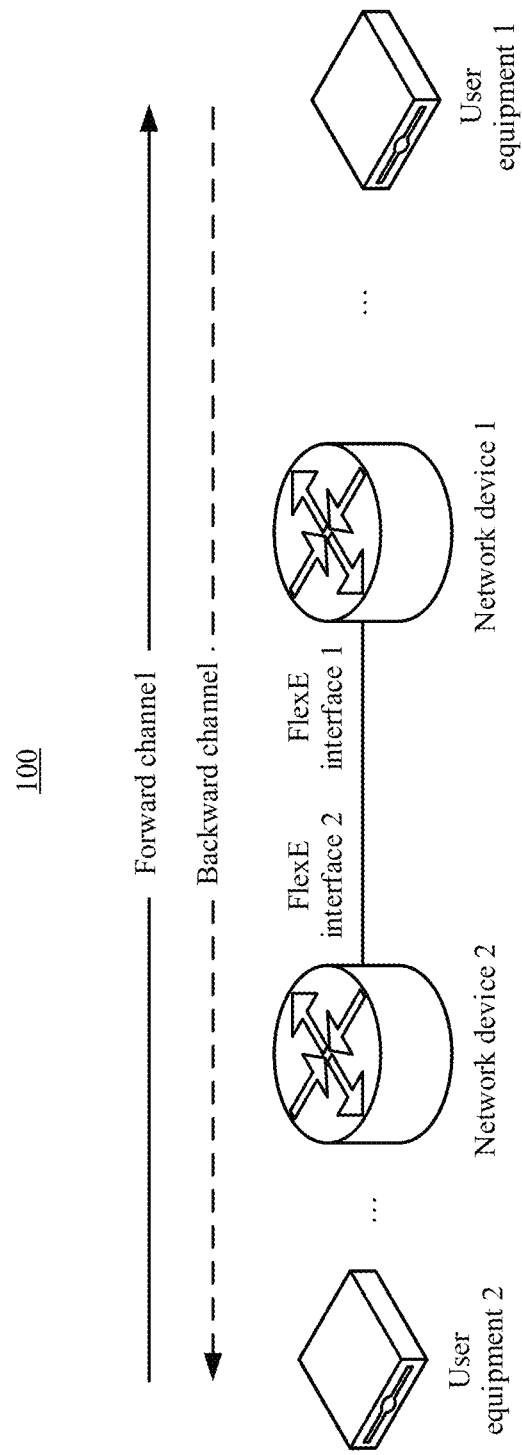
FIG. 3 is a schematic diagram of a network scenario according to an embodiment of this application.

FIG. 3 is a schematic diagram of an application scenario of a FlexE communications system according to this application. As shown in FIG. 3, the FlexE communications system 100 includes a network device 1, a network device 2, user equipment 1, and user equipment 2. The network device 1 may be an intermediate node. In this case, the network device 1 is connected to the user equipment 1 through another network device. The network device 1 may be an edge node. In this case, the network device 1 is directly connected to the user equipment 1. The network device 2 may be an intermediate node. In this case, the network device 2 is connected to the user equipment 2 through another network device. Alternatively, the network device 2 may be an edge node. In this case, the network device 2 is directly connected to the user equipment 2. The network device 1 includes a FlexE interface 1, and the network device 2 includes a FlexE interface 2. The FlexE interface 1 is adjacent to the FlexE interface 2. Each FlexE interface includes a transmit port and a receive port. A difference from a conventional Ethernet interface lies in that one FlexE interface may carry a plurality of clients, and a FlexE interface used as a logical interface may include a plurality of physical interfaces. A flow direction of service data in a forward channel shown in FIG. 3 is shown by a solid line arrow in FIG. 3, and a flow direction of service data in a backward channel is shown by a dashed line arrow in FIG. 3. A forward channel is used as an example of a transmission channel in the embodiments of the present invention, and a flow direction of service data in the transmission channel is: user equipment 2→network device 2→network device 1→user equipment 1.

It should be understood that FIG. 3 shows only an example of two network devices and two user equipment. The network may include any other quantity of network devices and any other quantity of user equipment. This is not limited in the embodiments of this application. The FlexE communications system shown in FIG. 3 is merely an example for description. An application scenario of the FlexE communications system provided in this application is not limited to the scenario shown in FIG. 3. The technical solutions provided in this application are applicable to all network scenarios in which data transmission is performed by using a FlexE technology.

Figure 4:
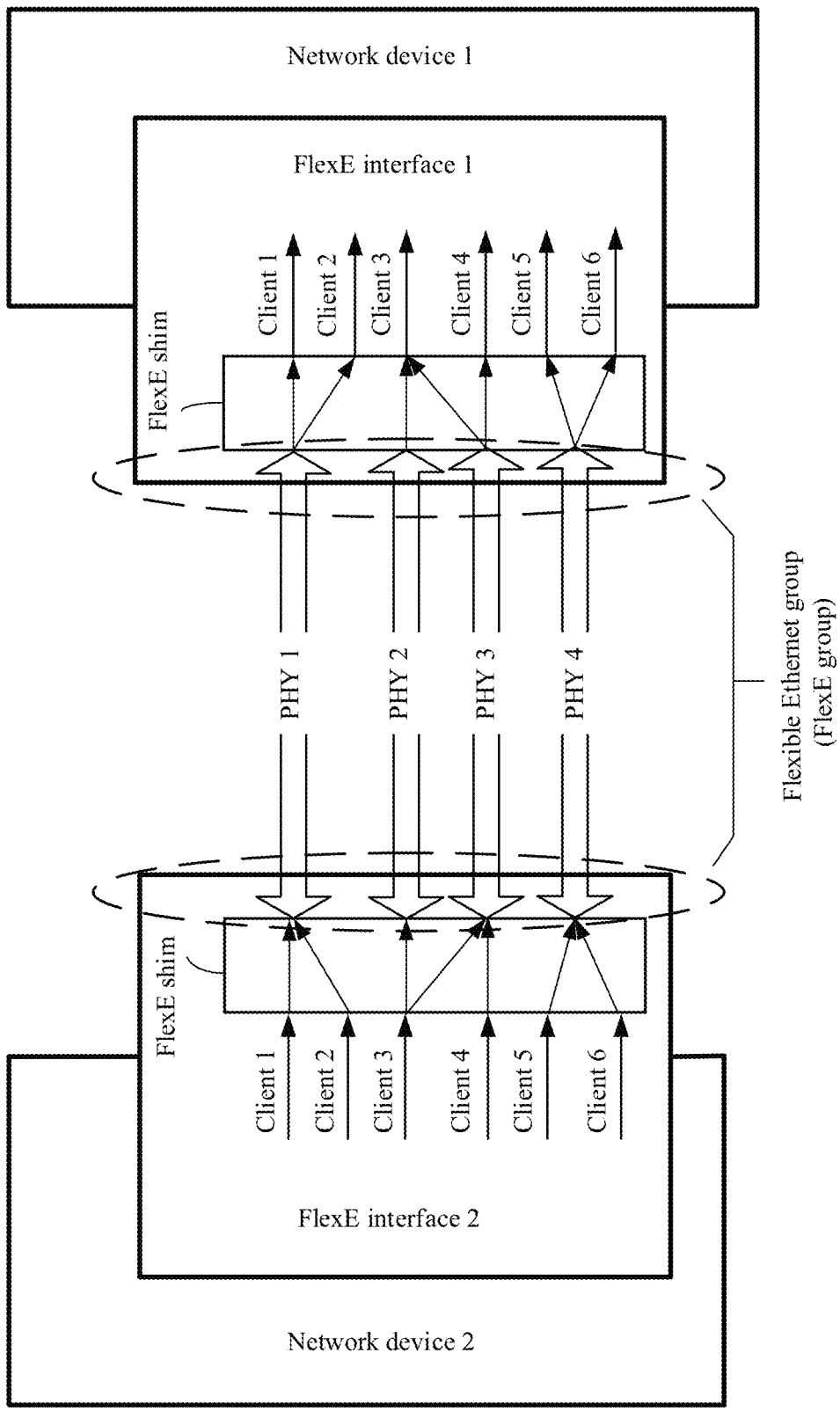
FIG. 4 is a schematic architectural diagram of transmitting information by using a FlexE technology according to an embodiment of this application.

With reference to FIG. 4, the following further describes a process in which the network device 1 and the network device 2 shown in FIG. 3 transmit data by using the FlexE technology.

As shown in FIG. 4, a PHY 1, a PHY 2, a PHY 3, and a PHY 4 are bound into a FlexE group. A network device 1 is connected to a network device 2 through FlexE group interfaces, that is, a FlexE interface 1 and a FlexE interface 2. It should be noted that the FlexE group interface may also be referred to as a FlexE interface. The FlexE group interface is a logical interface formed by binding a group of physical interfaces. The FlexE group interface carries six clients in total: a client 1 to a client 6. Data of the client 1 and the client 2 is mapped to the PHY 1 for transmission. Data of the client 3 is mapped to the PHY 2 and the PHY 3 for transmission. Data of the client 4 is mapped to the PHY 3 for transmission. Data of the client 5 and the client 6 is mapped to the PHY 4 for transmission. It can be learned that mapping and transmission for different FlexE clients are performed in the FlexE group, to implement a binding function.

The FlexE group may also be referred to as a binding group. A plurality of PHYs included in each FlexE group have a logical binding relationship. The logical binding relationship means that there may be no physical connection relationship between different PHYs. Therefore, the plurality of PHYs in the FlexE group may be physically independent of each other. A network device in FlexE may identify, by using the numbers of PHYs, specific PHYs included in a FlexE group, to implement logical binding of a plurality of PHYs. For example, each PHY may be numbered by using a number in 1 to 254, and 0 and 255 are reserved numbers. A number of a PHY may correspond to an interface on the network device. Two adjacent network devices need to use a same number to mark a same PHY. The numbers of PHYs included in the FlexE group do not need to be consecutive. Usually, there is one FlexE group between two network devices. However, this application does not limit that there is only one FlexE group between two network devices. In other words, there may be a plurality of FlexE groups between two network devices. One PHY may be used to carry at least one client, and one client may be transmitted on at least one PHY. PHYs include a physical layer apparatus (device) of a sending device and a physical layer apparatus of a receiving device. In addition to a PHY layer apparatus defined in IEEE 802.3, the PHYs in the FlexE further include an apparatus configured to perform a function of a FlexE shim layer. The physical layer apparatus of the sending device may also be referred to as a sending PHY or a PHY in a sending direction, and the physical layer apparatus of the receiving device may also be referred to as a receiving PHY or a PHY in a receiving direction.

The FlexE client corresponds to various user interfaces of a network, and is consistent with a conventional service interface in an existing IP/Ethernet network. The FlexE client may be flexibly configured based on a bandwidth requirement, and supports Ethernet MAC data streams (for example, a 10G data stream, a 40G data stream, an n×25G data stream, and even a non-standard-rate data stream) at various rates. For example, the data stream may be transmitted to the FlexE shim layer in a 64B/66B coding scheme. The FlexE client may be interpreted as an Ethernet stream based on a physical address. Clients sent by using a same FlexE group need to share a same clock, and these clients need to perform adaptation based on allocated slot rates.

The FlexE shim layer serves as an additional logical layer inserted between a MAC and a PHY (PCS sublayer) in a conventional Ethernet architecture. A core architecture of the FlexE technology is implemented by using a calendar-based slot distribution mechanism. A main function of the FlexE shim layer is to slice data based on a same clock, and encapsulate the sliced data into slots obtained through pre-division. Then, each slot obtained through division is mapped, based on a preconfigured slot configuration table, to a PHY in the FlexE group for transmission. Each slot is mapped to one PHY in the FlexE group.

The FlexE shim layer defines an overhead frame/an overhead multiframe, to reflect a calendar-based working mechanism and a mapping relationship between a client and a slot in the FlexE group. It should be noted that the foregoing overhead frame may also be referred to as a flexible Ethernet overhead frame, and the foregoing overhead multiframe may also be referred to as a flexible Ethernet overhead multiframe. The FlexE shim layer provides an inband management channel through overheads, and supports transmission of configuration and management information between two interconnected FlexE interfaces, to establish a link through automatic negotiation.

Figure 5:
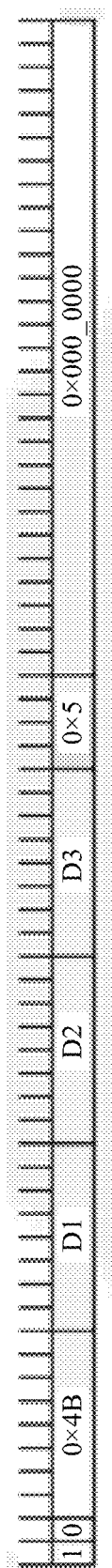
FIG. 5 is a schematic diagram of a code pattern definition of a first overhead block according to an embodiment of this application.

Specifically, one overhead multiframe includes 32 overhead frames, and one overhead frame includes eight overhead blocks. An overhead block may also be referred to as an overhead slot. The overhead block may be, for example, a code block in 64B/66B coding, and appears once at an interval of 1023×20 blocks, but fields included in all overhead blocks are different. In the overhead frame, a first overhead block (referred to as a first overhead block below) includes information such as a "0×4B" control character and a "0×5" "0" code character. As shown in FIG. 5, two header bits of the first overhead block are 10, a control block type is 0×4B, and the "0 code" character of the first overhead block is 0×5. During information transmission, the two interconnected FlexE interfaces determine, through matching based on the "0×4B" control character and the "0×5" "0" code" character, a first overhead block of an overhead frame transmitted on each PHY. The first overhead block transmitted on each PHY is used as a marker, and is used to align bound PHYs in the FlexE group in a receiving direction. Aligning the PHYs in the FlexE group can implement synchronous locking of data. Subsequently, data carried by the PHYs can be synchronously read from memories. A first code block of each overhead frame may also be referred to as a frame header of the overhead frame. Alignment of the PHYs in the FlexE group is essentially alignment of first overhead blocks of overhead frames of the PHYs. The following uses an example to describe a PHY alignment process with reference to a scenario in FIG. 4.

In the scenario shown in FIG. 4, when all PHYs in the FlexE group work normally, the network device 2 simultaneously sends an overhead frame 1 to an overhead frame 4 by using the PHY 1, the PHY 2, the PHY 3, and the PHY 4. The overhead frame 1 to the overhead frame 4 respectively include a first overhead block 1 to a first overhead block 4. The first overhead block 1, the first overhead block 2, the first overhead block 3, and the first overhead block 4 are in a one-to-one correspondence with the PHY 1, the PHY 2, the PHY 3, and the PHY 4.

In an actual transmission process, the network device 2 simultaneously sends the overhead frame 1 to the overhead frame 4. However, because the lengths of different optical fibers corresponding to the PHY 1, the PHY 2, the PHY 3, and the PHY 4 may be different, the first overhead block 1 to the first overhead block 4 possibly cannot be simultaneously received by the network device 1. For example, the network device 1 sequentially receives the first overhead block 1 to the first overhead block 4 in a sequence of the first overhead block 1→the first overhead block 2→the first overhead block 3→the first overhead block 4. After receiving the first overhead block 1, the network device 1 stores the first overhead block 1 in a memory 1 corresponding to the PHY 1. In sequence, the network device 1 stores the subsequently received first overhead block 2 in a memory 2 corresponding to the PHY 2, and stores the received first overhead block 3 in a memory 3 corresponding to the PHY 3. After receiving the first overhead block 4 transmitted on the PHY 4 and storing the first overhead block 4 in a memory 4 corresponding to the PHY 4, the network device 1 immediately starts to simultaneously read all the first overhead blocks and other cached data from all the memories. The "immediate start" means that after the last first overhead block 4 is cached into the memory, the network device 1 start simultaneous read operations on the memory 1 to the memory 4. Duration in which the last first overhead block 4 waits in a cache is near or almost 0. To be specific, for the first overhead block 4 that arrives the last, an interval duration between a write operation that the network device 1 caches the first overhead block 4 into the memory 4 and a read operation of reading the first overhead block 4 from the memory 4 is close to 0.

PHY alignment may also be referred to as FlexE group deskew. Through PHY alignment, a delay deviation between PHYs is eliminated, so that slot alignment is implemented among all PHYs in the FlexE group. The foregoing delay deviation is, for example, caused by different optical fiber lengths. In the prior art, after the foregoing PHY alignment operation is performed, when all the PHYs in the FlexE group are in a normal working state, slot alignment can be implemented for data sent by all the PHYs. Therefore, the network device 1 can simultaneously receive subsequently sent first overhead blocks of all the PHYs, simultaneously cache the first overhead blocks into corresponding memories, and simultaneously read stored data from the memories. In this way, data of each client is recovered based on the slot.

However, after one or more PHYs in the FlexE group are faulty, for example, when the PHY 4 is faulty, a client service carried by a PHY that works normally is damaged according to a solution in a current standard or the prior art. It should be noted that, in this application, referring to a definition in a current OIF FlexE standard, that the PHY is in a faulty state or the PHY is faulty means that the PHY encounters, for example, a signal loss, a framing failure, an alignment failure, a high bit error rate, or another case, resulting in PCS_status=FALSE.

The following briefly describes several current solutions for processing a fault of a PHY.

Solution 1: Currently, the following is defined in a FlexE standard specified by the OIF: when one or more PHYs in a FlexE group are faulty, consecutive Ethernet local fault ordered sets are sent for all FlexE clients in the FlexE group, where the Ethernet local fault ordered set is referred to as LF below. To be specific, a network device in a receiving direction writes the consecutive LFs into memories corresponding to all PHYs in the FlexE group. The foregoing operation causes interruption of all client services in the FlexE group.

Solution 2: A working FlexE group is switched to a protection FlexE group by using a protection mechanism such as automatic protection switching (APS), and the protection FlexE group is used to carry client services. However, the foregoing operation also causes interruption of all client services in the FlexE group in the switching process, and interruption duration may be up to, for example, 50 ms.

Solution 3: After a PHY 4 is faulty, a network device removes the faulty PHY 4 from a FlexE group, recreates a new FlexE group that does not include the PHY 4, and uses the new FlexE group to continue to carry client services. However, the foregoing operation also causes service interruption of all client services in the FlexE group in a group recreation process.

It can be learned from the foregoing that, when one or more PHYs in the FlexE group are faulty, how to effectively reduce impact on a client service carried by a PHY in a normal working state in the FlexE group becomes a problem to be resolved. To resolve the foregoing problem, this application provides a fault isolation method 100.

Figure 6:
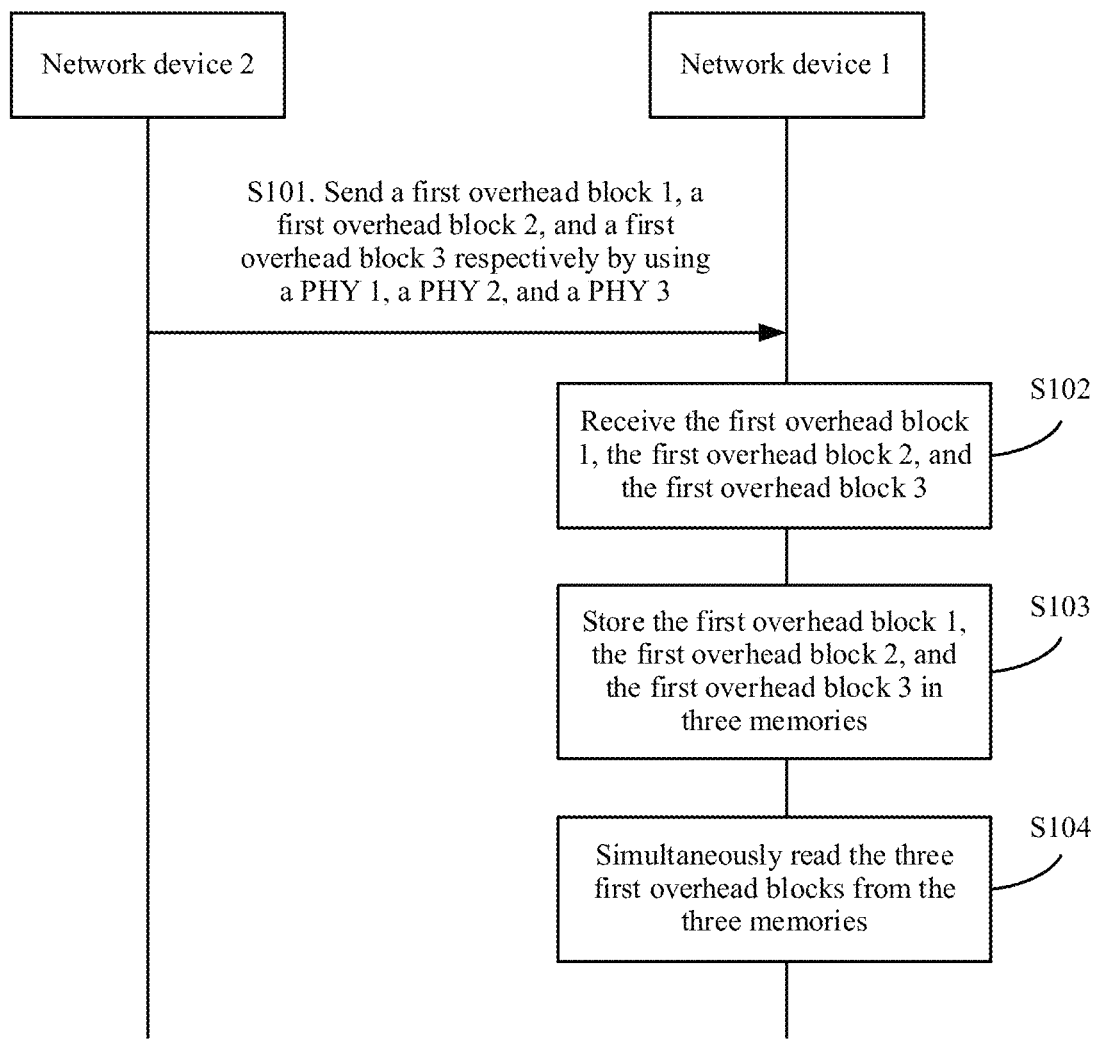
FIG. 6 is a schematic flowchart of a communication method for fault isolation according to an embodiment of this application.

The following describes in detail the method 100 in the embodiments of this application with reference to FIG. 6. A network architecture to which the method 100 is applied includes a network device 1 and a network device 2. For example, the network device 1 may be the network device 1 shown in FIG. 3 or FIG. 4, and the network device 2 may be the network device 2 shown in FIG. 3 or FIG. 4. The network device 1 and the network device 2 are connected through a FlexE group. The network architecture may be the network architecture shown in FIG. 3 or FIG. 4. The following describes the method 100 by using the architecture in FIG. 4 as an example. The method 100 includes the following operations S101 to S104 performed in a time period 1.

S101. The network device 2 simultaneously sends three FlexE overhead frames to the network device 1 by using a PHY 1, a PHY 2, and a PHY 3 in the FlexE group.

Specifically, the network device 2 sends a FlexE overhead frame 1 to the network device 1 by using the PHY 1, and the FlexE overhead frame 1 includes a first overhead block 1. The network device 2 sends a FlexE overhead frame 2 to the network device 1 by using the PHY 2, and the FlexE overhead frame 2 includes a first overhead block 2. The network device 3 sends a FlexE overhead frame 3 to the network device 1 by using the PHY 3, and the FlexE overhead frame 3 includes a first overhead block 3.

In a time period A, a PHY 4 in the FlexE group is in a faulty state, and the PHY 1, the PHY 2, and the PHY 3 are all in a normal working state. When the PHY 4 is in a faulty state, the network device 2 may send a corresponding FlexE overhead frame by using the PHY 4. In this case, for example, if an optical fiber corresponding to the PHY 4 is broken, even if the network device 2 sends the FlexE overhead frame, the network device 1 cannot receive the FlexE overhead frame. For another example, if an optical fiber corresponding to the PHY 4 is in poor contact, a bit error rate of a link is high. In this case, even if the network device 2 sends the FlexE overhead frame, the network device 1 determines, based on received data, that a high bit error rate fault occurs in the PHY 4, and discards data transmitted by the PHY 4. Certainly, the network device 2 may alternatively not send the FlexE overhead frame, but synchronously send the FlexE overhead frame when the fault of the PHY 4 is recovered. This is not specifically limited in this application.

For a specific process in which the network device 2 sends the FlexE overhead frame, refer to a method in the prior art. Details are not described herein.

S102. The network device 1 receives the first overhead block 1, the first overhead block 2, and the first overhead block 3 by using the PHY 1, the PHY 2, and the PHY 3.

S103. The network device 1 stores the three received first overhead blocks in three memories, where the three first overhead blocks are in a one-to-one correspondence with the three memories. In the network device 1, each PHY has a corresponding memory, configured to store PHY-related data.

S104. The first network device simultaneously reads the three first overhead blocks from the three memories.

In this application, when one or more PHYs in a current FlexE group are faulty, a first overhead block of the faulty PHY is not used as a determining condition for PHY alignment. To be specific, it is considered that PHYs in the FlexE group are aligned if that first overhead blocks of PHYs that are currently in a normal state in the FlexE group are all stored in corresponding memories. According to the technical solution provided in this application, the impact of a faulty PHY on a normal PHY can be effectively isolated without the need to insert an LF into a client, start group-level protection switching, and recreate a FlexE group. Therefore, it is ensured that a client service carried by the normal PHY is not affected, thereby improving service transmission reliability.

In a specific implementation, in the time period 1, the method 100 further includes:

the network device 1 sends consecutive LFs in a slot to which a client carried by the PHY 4 in a faulty state is mapped.

The network device 1 may send, in but not limited to the following manners, the consecutive LFs in the slot to which the client carried by the PHY 4 in a faulty state is mapped.

Manner 1: The network device 1 writes the consecutive Ethernet local fault ordered sets into a memory corresponding to the PHY 4 in a faulty state.

The LFs are written into the memory corresponding to the faulty PHY, so that during client service recovery, the network device can determine, based on the LFs, that an error has occured in the corresponding client, thereby avoiding providing incorrect data for a user.

For example, the network device 1 transmits data by using a FlexE cross technology, and writes the LFs into the memory corresponding to the faulty PHY, so that when a client service carried by the faulty PHY is forwarded to a downstream device, the LFs are inserted into the client, and the client service continues to be forwarded to the downstream device. Finally, a sink device may identify, based on the LFs, that an error occurs in the client service carried by the PHY 4. In this way, incorrect data can be discarded in a timely manner, to avoid providing incorrect data to the user.

Manner 2: When the PHY 4 is faulty, the network device 1 writes no LF into the memory corresponding to the PHY 4. In this case, the received data may be written, or an idle block is written, or no data is written. When recovering the client carried by the PHY 4, the network device 1 writes the LFs in the slot to which the client is mapped. In a specific implementation, the network device 1 reads cached data from the memory corresponding to the PHY, recovers the data of the client, and stores the data of the client in memories corresponding to all clients. Then, the consecutive LFs are written into the memory corresponding to the client.

In a specific implementation, before the network device 1 stores the three first overhead blocks in the three memories, the method 100 further includes: after determining that the PHY 4 is in a faulty state, the network device 1 sends an alarm, where the alarm indicates that a fault occurs in the FlexE group; and the network device 1 determines that a fault type of the PHY 4 is a first fault type, and stops the alarm.

In this implementation, the prior art may be effectively made compatible with the new implementation. In the prior art, when a PHY is faulty, a group-level alarm indication is triggered. Once the group-level alarm is triggered, service processing is interrupted until the alarm is stopped. However, according to the method provided in this application, after determining that the PHY fault belongs to a predetermined fault type, the network device stops the alarm. In this way, subsequent processing may continue to be performed on data received by a normal PHY, and no service is interrupted.

In another specific implementation, before the network device 1 stores the three first overhead blocks in the three memories, the method 100 further includes:

the first network device determines that a first PHY is in a faulty state, where the first PHY is one of the m PHYs; and the first network device determines that a fault type of the first PHY is a first fault type, and avoids sending an alarm indicating that a fault occurs in the FlexE group.

In this implementation, after the PHY is faulty, the fault type of the PHY is first determined. Then, whether to send the alarm indicating that a fault has occurred in the FlexE group is determined based on the fault type of the PHY. Therefore, when the PHY fault belongs to a specific fault type, no alarm is sent. In this way, subsequent processing may continue to be performed on data received by a normal PHY, and no service is interrupted.

In this application, the network device 1 identifies the fault type of the PHY, and may perform corresponding processing for different fault types. There may be two fault types: the first fault type and a second fault type. In the first fault type, the network device 1 may isolate the faulty PHY by using the fault isolation method provided in this application. A client unrelated to the faulty PHY can still work normally and is not affected by the faulty PHY. In the process, no LF is written for a client carried by a normal PHY, and no group is recreated. The first fault type includes, but is not limited to, optical fiber fault, high bit error rate, optical module damage, and the like.

If the PHY fault belongs to the second fault type, for example, deskew at a shim layer fails, a group number is incorrectly configured, or an instance number is incorrectly configured, after a group-level alarm is sent for the fault type, consecutive LFs are inserted into all clients carried in the FlexE group.

Specific types of faults included in the first fault type and the second fault type may be flexibly set in specific implementations by a person skilled in the art. Details are not described in this application.

In conclusion, according to the method provided in this application, a faulty PHY can be effectively isolated, impact on a client carried by a normal PHY can be reduced, and service transmission reliability can be improved.

For the PHY 4, if a cause of the fault of the PHY 4 is a fault of a FlexE shim layer, for example, data in a sending direction is incorrect due to the fault of the shim layer, after the cause of the fault disappears, the faulty PHY can be automatically recovered and be added to the FlexE group, and can normally carry a client without recreating a group. After the fault is recovered, the network device 2 synchronously sends data, and the network device 1 synchronously receives the data, and processes the received data according to a method in the prior art.

However, there are still some cases. For example, when a break of an optical fiber causes a fault in a PHY, the optical fiber needs to be changed to eliminate the fault. Changing the optical fiber may change a transmission delay of the PHY relative to the transmission delay prior to the fault. For example, a changed optical fiber may become longer, and in a data receiving direction, a first overhead block on the PHY 4 arrives at the network device 1 later than a first overhead block on another PHY. Consequently, the network device 1 cannot align all PHYs. In this case, a PHY alignment operation needs to be performed again. However, if the PHY alignment operation is performed again, service interruption occurs to a client being transmitted. To implement lossless recovery of a faulty PHY, this application provides a fault recovery processing method 200.

Figure 7:
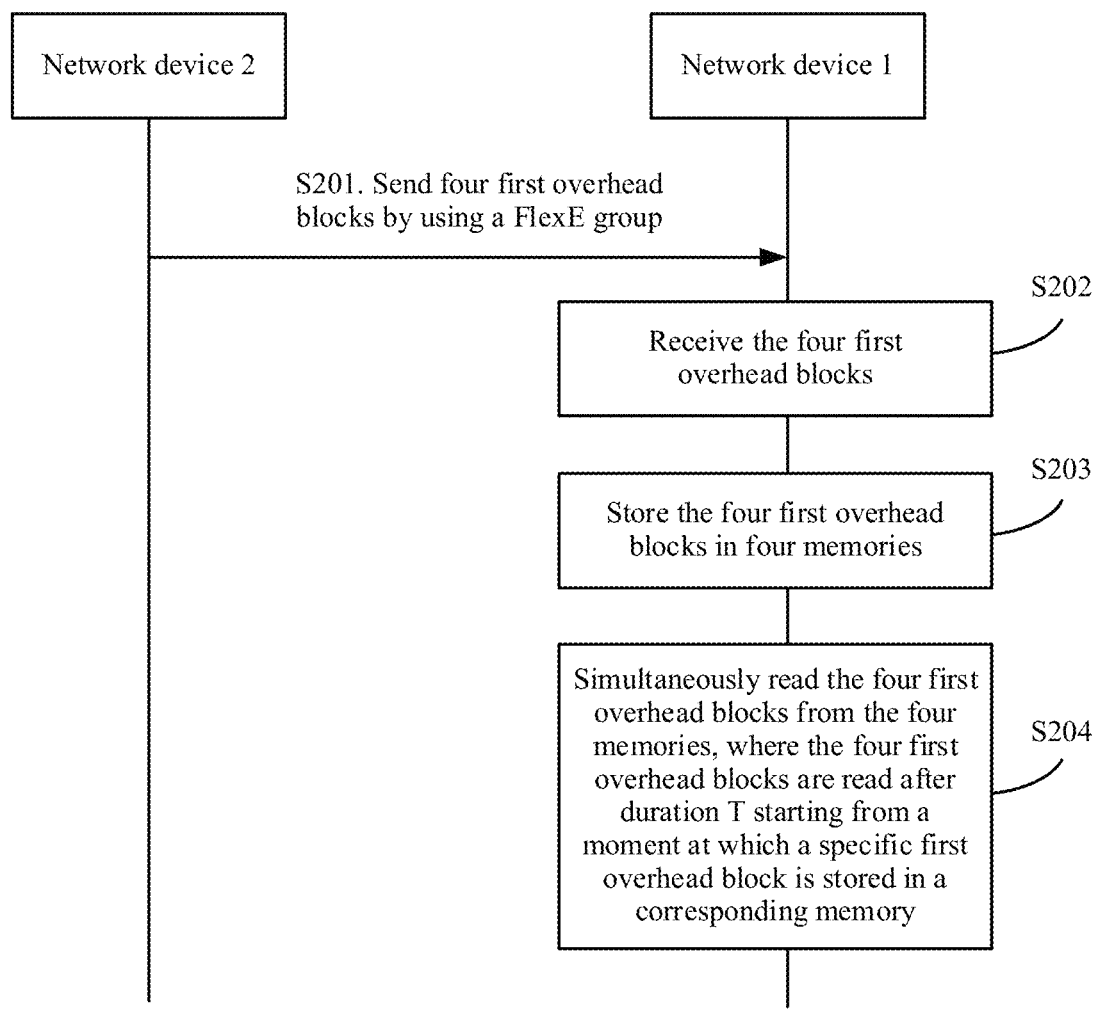
FIG. 7 is a schematic flowchart of a communication method for fault recovery according to an embodiment of this application.

The following specifically describes, with reference to FIG. 7, the fault recovery processing method 200 provided in this application. In a time period 2, the method 200 includes the following operations S201 to S204. It should be noted that the operations in the method 200 need to be performed before the method 100, so that when a fault of a PHY is recovered, the PHY can be added to a group again without a loss.

S201. In the time period 2, a network device 2 sends four FlexE overhead frames to a network device 1 by using a FlexE group. The four FlexE overhead frames are respectively a FlexE overhead frame A, a FlexE overhead frame B, a FlexE overhead frame C, and a FlexE overhead frame D. The four FlexE overhead frames include four first overhead blocks. Specifically, the network device 2 sends the FlexE overhead frame A to the network device 1 by using a PHY 1, and the FlexE overhead frame A includes a first overhead block A. The network device 2 sends the FlexE overhead frame B to the network device 1 by using a PHY 2, and the FlexE overhead frame B includes a first overhead block B. The network device 2 sends the FlexE overhead frame C to the network device 1 by using a PHY 3, and the FlexE overhead frame C includes a first overhead block C. The network device 2 sends the FlexE overhead frame D to the network device 1 by using a PHY 4, and the FlexE overhead frame D includes a first overhead block D.

S202. The network device 1 receives, by using the FlexE group, four first overhead blocks sent by the network device 2.

S203. The network device 1 stores the four received first overhead blocks in four memories, where the four first overhead blocks are in a one-to-one correspondence with the four memories.

S204. The network device 1 simultaneously reads the four first overhead blocks from the four memories. The four first overhead blocks are read after a preset duration T starting from the moment at which a specific first overhead block is stored in a corresponding memory. The specific first overhead block is a last stored first overhead block in the four first overhead blocks. The preset duration T is greater than or equal to one clock cycle, and the clock cycle is duration required by the network device 1 to perform one read operation on one memory. In one read operation, the network device 1 may read at least one data block from one memory. In a specific implementation, the duration T is greater than or equal to two clock cycles.

In a specific implementation, when the device is powered on and performs a PHY alignment operation, the foregoing operations S201 to S204 in the foregoing method 200 are performed. In this application, a memory read delaying mechanism, namely, a mechanism for delaying reading the memory, is set, so that after a first overhead block that arrives the latest at the network device 1 in the FlexE group is stored in a memory, cached data starts to be simultaneously read from all memories, that is, first overhead blocks that correspond to PHYs and that are stored in the memories start to be simultaneously read, after the preset duration T. Therefore, a delay difference that may be caused by different PHYs during faulty PHY recovery can be absorbed in the caching duration T, so that PHY re-alignment caused by the delay difference between the different PHYs is avoided. In this way, service interruption is avoided, and lossless recovery of the faulty PHY can be implemented.

It may be understood that, in the four first overhead blocks, a first overhead block that stays in the memory of the network device 1 for shortest duration is a specific first overhead block. Duration in which each of the other three first overhead blocks stays in the memory of the network device 1 is greater than the duration T.

The duration T may be adaptively configured according to a specific design solution in an actual network. T may be w clock cycles. W may be any integer in the range of [1, 1000]. For example, w may be 2, 5, 10, 50, 100, 200, 300, 400, or 500. Certainly, T may alternatively be greater than 1000 clock cycles.

Figure 8:
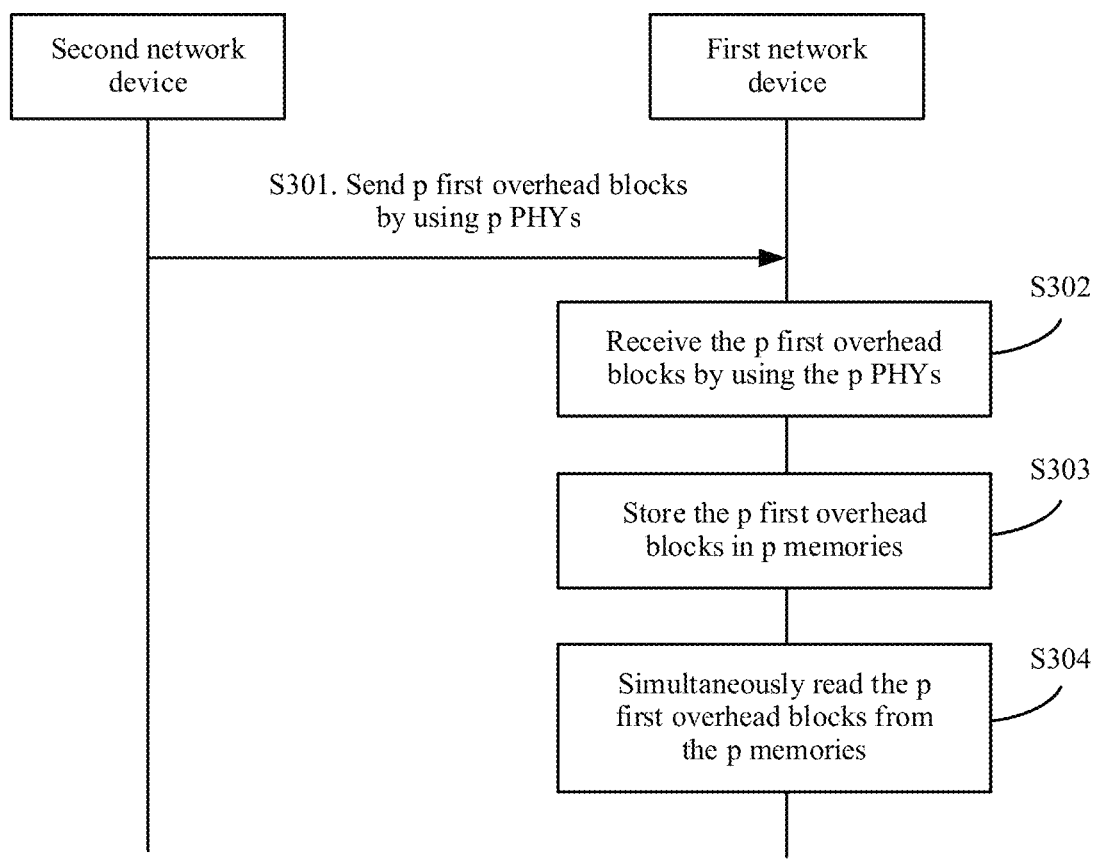
FIG. 8 is a schematic flowchart of another communication method for fault isolation according to an embodiment of this application.

FIG. 8 is a schematic flowchart of a communication method 300 according to an embodiment of this application. A network architecture to which the method 300 is applied includes at least a first network device and a second network device. For example, the first network device may be the network device 1 shown in FIG. 3 or FIG. 4, and the second network device may be the network device 2 shown in FIG. 3 or FIG. 4. The network architecture may be the network architecture shown in FIG. 3 or FIG. 4. In addition, the method shown in FIG. 8 may be used to specifically implement the method shown in FIG. 6. For example, the first network device and the second network device in FIG. 8 may be respectively the network device 1 and the network device 2 in the method 100 shown in FIG. 6. In a first time period, the method 300 includes the following operations S301 to S304.

S301. The second network device simultaneously sends p FlexE overhead frames to a network device 1 by using p current available PHYs in a FlexE group.

The p FlexE overhead frames include p first overhead blocks, the p first overhead blocks are in a one-to-one correspondence with the p FlexE overhead frames, and the p FlexE overhead frames are in a one-to-one correspondence with the p PHYs. The FlexE group includes n PHYs, where n≥2, and n is an integer. In the first time period, m PHYs in the FlexE group are in a faulty state, the p PHYs are in a normal state, p+m=n, n≥2, 1≤m<n, and both m and p are integers.

S302. The first network device receives, by using the p physical layer apparatuses (PHYs) in the flexible Ethernet group (FlexE group), the p first overhead blocks sent by the second network device.

S303. The first network device stores the p first overhead blocks in p memories in n memories, where the p first overhead blocks are in a one-to-one correspondence with the p memories.

S304. The first network device simultaneously reads the p first overhead blocks from the p memories.

In a specific implementation, in the first time period, the method 300 further includes:

the first network device sends consecutive Ethernet local fault ordered sets in slots to which clients carried by the m PHYs are mapped.

The first network device may send, in but not limited to the following manners, the consecutive LFs in the slots to which the clients carried by the m PHYs are mapped.

Manner 1: The first network device writes the consecutive Ethernet local fault ordered sets into m memories corresponding to the m PHYs.

The LFs are written into the memories corresponding to the faulty PHYs, so that during client service recovery, the network device can determine, based on the LFs, that an error occurs in the corresponding clients, thereby avoiding providing incorrect data for a user.

Manner 2: When the m PHYs are faulty, the first network device writes no LF into the m memories corresponding to the m PHYs 4. In this case, the received data may be written into the m memories, or idle blocks are written, or no data is written. When recovering the clients carried by the m PHYs 4 in a faulty state, the first network device writes the LFs in the slots to which the clients are mapped. In a specific implementation, when recovering data of the clients from the m memories, the first network device writes the data of the clients into memories corresponding to all clients. Then, the consecutive LFs are written into the memories corresponding to the clients.

In a specific implementation, before the first network device stores the p first overhead blocks in the p memories in the n memories, the method further includes:

the first network device determines that a first PHY is in a faulty state, where the first PHY is one of the m PHYs;

the first network device sends an alarm, where the alarm indicates that a fault occurs in the FlexE group; and the first network device determines that a fault type of the first PHY is a first fault type, and stops the alarm.

In a specific implementation, in the first time period, before the first network device stores the p first overhead blocks in the p memories in then memories, the method further includes:

the first network device determines that a first PHY is in a faulty state, where the first PHY is one of the m PHYs; and the first network device determines that a fault type of the first PHY is a first fault type, and avoids sending an alarm indicating that a fault has occurred in the FlexE group.

When the method shown in FIG. 8 is used to implement the method 100 shown in FIG. 6, the first time period is, for example, the time period 1 in the method 100. The p available PHYs are the PHY 1, the PHY 2, and the PHY 3. The m PHYs in a faulty state are, for example, the PHY 4. For specific implementation details of the operations in the method 300, refer to specific descriptions in the method 100. Details are not described herein again.

Figure 9:
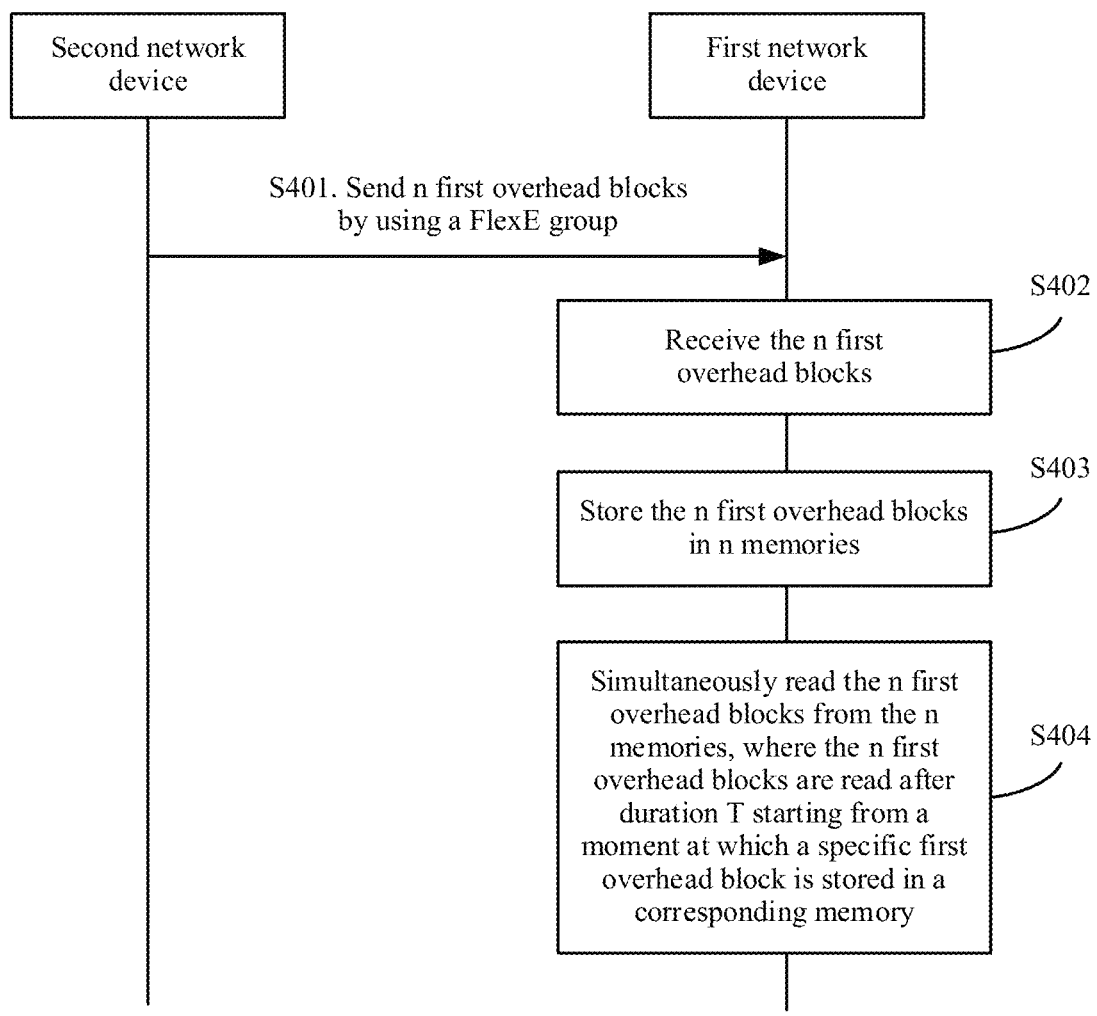
FIG. 9 is a schematic flowchart of another communication method for fault recovery according to an embodiment of this application.

FIG. 9 is a schematic flowchart of a communication method 400 according to an embodiment of this application. A network architecture to which the method 400 is applied includes at least a first network device and a second network device. For example, the first network device may be the network device 1 shown in FIG. 3 or FIG. 4, and the second network device may be the network device 2 shown in FIG. 3 or FIG. 4. The network architecture may be the network architecture shown in FIG. 3 or FIG. 4. In addition, the method 400 shown in FIG. 9 may be used to specifically implement the method 200 shown in FIG. 7. For example, the first network device and the second network device in FIG. 9 may be respectively the network device 1 and the network device 2 in the method 200 shown in FIG. 7. In a second time period, the method 400 includes the following operations S401 to S404.

S401. In the second time period, the second network device sends n FlexE overhead frames to the first network device by using a FlexE group.

The FlexE group includes the n physical layer apparatuses PHYs. The n FlexE overhead frames include n first overhead blocks. The n first overhead blocks are in a one-to-one correspondence with the n FlexE overhead frames. The n FlexE overhead frames are in a one-to-one correspondence with the n PHYs, where n≥2, and n is an integer.

S402. The first network device receives, by using the flexible Ethernet group FlexE group, the n first overhead blocks sent by the second network device.

S403. The first network device stores the n first overhead blocks in n memories, where the n first overhead blocks are in a one-to-one correspondence with the n memories.

S404. The first network device simultaneously reads the n first overhead blocks from the n memories, where the n first overhead blocks are read after duration T starting from the moment at which a specific first overhead block is stored in a corresponding memory.

The specific first overhead block is the last stored first overhead block in the n first overhead blocks. The duration T is greater than or equal to one clock cycle, and the clock cycle is the duration required by the first network device to perform one read operation on one memory.

When the method shown in FIG. 9 is used to implement the method 200 shown in FIG. 7, the second time period is, for example, the time period 2 in the method 200. The n available PHYs are the PHY 1, the PHY 2, the PHY 3, and the PHY 4. For specific implementation details of the operations in the method 400, refer to specific descriptions in the method 200. Details are not described herein again.

Figure 10:
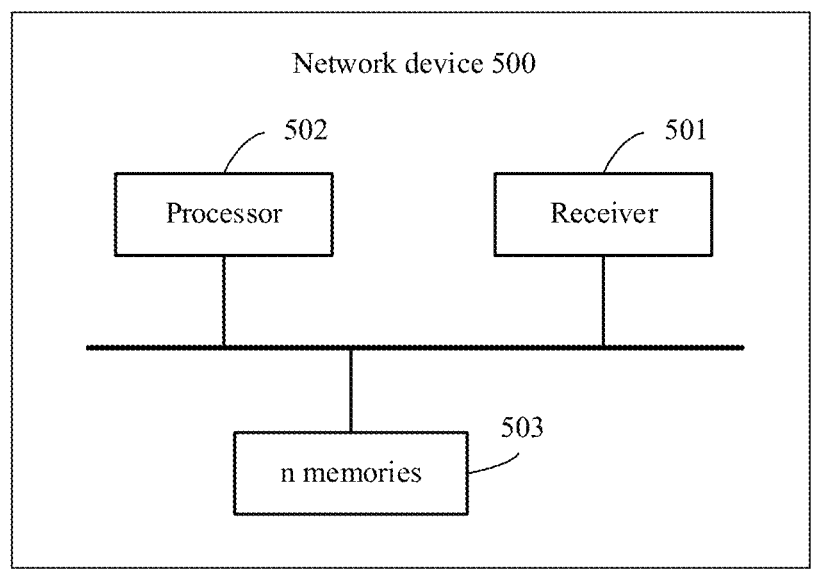
FIG. 10 is a schematic structural diagram of a network device according to an embodiment of this application.

FIG. 10 is a schematic diagram of a network device 500 according to this application. The network device 500 may be used in the network architecture shown in FIG. 3 or FIG. 4, and is configured to perform an operation performed by the network device 1 in the method 100 or the method 200, or is configured to perform an operation performed by the first network device in the method 300 or the method 400. The network device 500 may be, for example, the network device 1 in the network architecture shown in FIG. 3 or FIG. 4, or may be a line card or a chip that implements a related function. As shown in FIG. 10, the network device 500 includes a receiver 501, a processor 502 coupled to the receiver, and n memories 503. The receiver 501 is specifically configured to perform an information receiving operation performed by the network device 1 in the method 100 or the method 200. The processor 502 is configured to perform processing, other than receiving information, performed by the network device 1 in the method 100 or the method 200. The n memories 503 are configured to store FlexE data received by the network device 1 by using the FlexE group in the method 100 or the method 200. The receiver 501 is further configured to perform an information receiving operation performed by the first network device in the method 300 or the method 400. The processor 502 is configured to perform processing, other than receiving information, performed by the first network device in the method 300 or the method 400. The n memories 503 are configured to store FlexE data received by the first network device by using the FlexE group in the method 300 or the method 400.

The receiver may refer to one interface, or may refer to a plurality of logically bound interfaces. The interface may be, for example, an interface between a PHY layer and a transmission medium layer, such as a medium dependent interface (MDI). The interface may alternatively be a physical interface of a network device. The processor 502 may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof. The processor 502 may be a central processing unit (CPU), a network processor (English: network processor, NP for short), or a combination of a CPU and an NP. The processor 502 may be one processor, or may include a plurality of processors. The memory 503 may include a volatile memory, such as a random-access memory (RAM for short); or the memory may include a non-volatile memory, such as a read-only memory (ROM), a flash memory, a hard disk drive (HDD), or a solid-state drive (SSD); or the memory 820 may include a combination of the foregoing types of memories. Then memories 503 in this application may be n independent memories. The n memories may alternatively be integrated into one or more memories. In this case, the memories may be understood as different storage areas in a corresponding memory.

The receiver 501, the processor 502, and the n memories 503 may be independent physical units. The processor 502 and the n memories 503 may be integrated together, and implemented by using hardware. The receiver 501 may also be integrated with the processor 502 and the n memories 503, and implemented by using hardware. The hardware may be, for example, an ASIC, a PLD, or a combination thereof. The PLD may be a CPLD, an FPGA, generic array logic (GAL), or any combination thereof.

Steps of the methods or algorithms described in the embodiments of this application may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may connect to a processor, so that the processor may read information from the storage medium and write information into the storage medium. Optionally, the storage medium may be alternatively integrated into the processor. The processor and the storage medium may be disposed in an ASIC.

It should be understood that sequence numbers of the foregoing processes do not mean an execution sequence in various embodiments of this application. The execution sequence of the processes should be determined according to functions and internal logic of the processes, and should not be construed as any limitation on the implementation processes of the embodiments of this application.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or may be a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The embodiments in this specification are all described in a progressive manner. For same or similar parts in the embodiments, refer to these embodiments. Each embodiment focuses on a difference from other embodiments. Especially, apparatus and system embodiments are basically similar to a method embodiment, and therefore are described briefly. For related parts, refer to descriptions in the method embodiment.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

The invention claimed is:

1. A flexible Ethernet (FlexE) communication method, wherein the method comprises:
receiving, by a first network device by using p physical layer apparatuses (PHYs) in a FlexE group, p first overhead blocks sent by a second network device, wherein the p first overhead blocks are in a one-to-one correspondence with p FlexE overhead frames, the p FlexE overhead frames are in a one-to-one correspondence with the p PHYs, the FlexE group includes n PHYs, n>2, and n is an integer, wherein
m PHYs in the FlexE group are in a faulty state, the p PHYs are in a normal state, p+m=n, 1≤m<n, and both m and p are integers;
storing, by the first network device, the p first overhead blocks in p memories in n memories, wherein the p first overhead blocks are in a one-to-one correspondence with the p memories; and
simultaneously reading, by the first network device, the p first overhead blocks from the p memories.

2. The method according to claim 1, wherein the method further comprises:
sending, by the first network device, consecutive Ethernet local fault ordered sets in slots to which clients carried by the m PHYs are mapped.

3. The method according to claim 2, wherein
the sending, by the first network device, consecutive Ethernet local fault ordered sets in slots to which clients carried by the m PHYs are mapped comprises:
writing, by the first network device, the consecutive Ethernet local fault ordered sets into m memories corresponding to the m PHYs.

4. The method according to claim 1, wherein before the storing, by the first network device, the p first overhead blocks in the p memories in the n memories, the method further comprises:
determining, by the first network device, that a first PHY is in a faulty state, wherein the first PHY is one of the m PHYs;
sending, by the first network device, an alarm, wherein the alarm indicates that a fault occurs in the FlexE group; and
determining, by the first network device, that a fault type of the first PHY is a first fault type, and stopping the alarm.

5. The method according to claim 1, wherein before the storing, by the first network device, the p first overhead blocks in the p memories in the n memories, the method further comprises:

determining, by the first network device, that a first PHY is in a faulty state, wherein the first PHY is one of the m PHYs; and determining, by the first network device, that a fault type of the first PHY is a first fault type, and avoiding sending an alarm indicating that a fault occurs in the FlexE group.

6. A first network device, comprising a receiver, a processor, and n memories, wherein the receiver is configured to receive, by using p physical layer apparatuses (PHYs) in a flexible Ethernet (FlexE) group, p first overhead blocks sent by a second network device, wherein the p first overhead blocks are in a one-to-one correspondence with p FlexE overhead frames, the p FlexE overhead frames are in a one-to-one correspondence with the p PHYs the FlexE group comprises n PHYs, n>2, n is an integer, m PHYs in the FlexE group are in a faulty state, the p PHYs are in a normal state, p+m=n, 1<m<n, and both m and p are integers; and the processor is configured to: store the p first overhead blocks in p memories in the n memories, and simultaneously read the p first overhead blocks from the p memories, wherein the p first overhead blocks are in a one-to-one correspondence with the p memories.

7. The first network device according to claim 6, wherein the processor is further configured to:

send consecutive Ethernet local fault ordered sets in slots to which clients carried by the m PHYs are mapped.

8. The first network device according to claim 7, wherein the processor is further configured to write the consecutive Ethernet local fault ordered sets into m memories corresponding to the m PHYs.

9. The first network device according to claim 6, wherein before the processor stores the p first overhead blocks in the p memories in the n memories, the processor is further configured to:

determine that a first PHY is in a faulty state, wherein the first PHY is one of the m PHYs;

send an alarm, wherein the alarm is used to indicate that a fault has occurred in the FlexE group; and determine that a fault type of the first PHY is a first fault type, and stop the alarm.

10. The first network device according to claim 6, wherein before the processor stores the p first overhead blocks in the p memories in the n memories, the processor is further configured to:

determine that a first PHY is in a faulty state, wherein the first PHY is one of the m PHYs; and determine that a fault type of the first PHY is a first fault type, and avoid sending an alarm indicating that a fault has occurred in the FlexE group.

11. A non-transitory computer-readable storage medium, comprising a computer program, wherein when the program is run by a processor, the processor is enabled to perform the method comprising:

receiving, by using p physical layer apparatuses (PHYs) in a FlexE group, p first overhead blocks sent by a second network device, wherein the p first overhead blocks are in a one-to-one correspondence with p FlexE overhead frames, the p FlexE overhead frames are in a one-to-one correspondence with the p PHYs, the FlexE group includes n PHYs, n>2, and n is an integer, wherein m PHYs in the FlexE group are in a faulty state, the p PHYs are in a normal state, p+m=n, 1<m<n, and both m and p are integers;

storing the p first overhead blocks in p memories in n memories, wherein the p first overhead blocks are in a one-to-one correspondence with the p memories; and simultaneously reading the p first overhead blocks from the p memories.

12. The non-transitory computer-readable storage medium according to claim 11, wherein the method further comprises:

sending consecutive Ethernet local fault ordered sets in slots to which clients carried by the m PHYs are mapped.

13. The non-transitory computer-readable storage medium according to claim 12, wherein the sending consecutive Ethernet local fault ordered sets in slots to which clients carried by the m PHYs are mapped comprises:

writing the consecutive Ethernet local fault ordered sets into m memories corresponding to the m PHYs.

14. The non-transitory computer-readable storage medium according to claim 11, wherein before the storing, the p first overhead blocks in the p memories in the n memories, the method further comprises:

determining that a first PHY is in a faulty state, wherein the first PHY is one of the m PHYs; sending an alarm, wherein the alarm indicates that a fault occurs in the FlexE group; and determining that a fault type of the first PHY is a first fault type, and stopping the alarm.

15. The non-transitory computer-readable storage medium according to claim 11, wherein before the storing, the p first overhead blocks in the p memories in the n memories, the method further comprises:

determining that a first PHY is in a faulty state, wherein the first PHY is one of the m PHYs; and determining that a fault type of the first PHY is a first fault type, and avoiding sending an alarm indicating that a fault occurs in the FlexE group.

* * * * *

UNITED STATES PATENT AND TRADEMARK OFFICE
CERTIFICATE OF CORRECTION

PATENT NO. : 11,792,067 B2
APPLICATION NO. : 17/404220
DATED : October 17, 2023
INVENTOR(S) : Chunrong Li et al.

It is certified that error appears in the above-identified patent and that said Letters Patent is hereby corrected as shown below:

In the Claims

In Column 20, Line 33, in Claim 1, delete "n>2," and insert -- $n \geq 2$, --.

In Column 21, Line 20, in Claim 6, delete "PHYs" and insert -- PHYs, --.

In Column 21, Line 21, in Claim 6, delete "n>2," and insert -- $n \geq 2$, --.

In Column 21, Line 23, in Claim 6, delete "1<m<n," and insert -- $1 \leq m < n$, --.

In Column 22, Line 12, in Claim 11, delete "n>2," and insert -- $n \geq 2$, --.

In Column 22, Line 15, in Claim 11, delete "1<m<n," and insert -- $1 \leq m < n$, --.

Signed and Sealed this
Second Day of July, 2024

Katherine Kelly Vidal
*Director of the United States Patent and Trademark Office*